Figure 1:
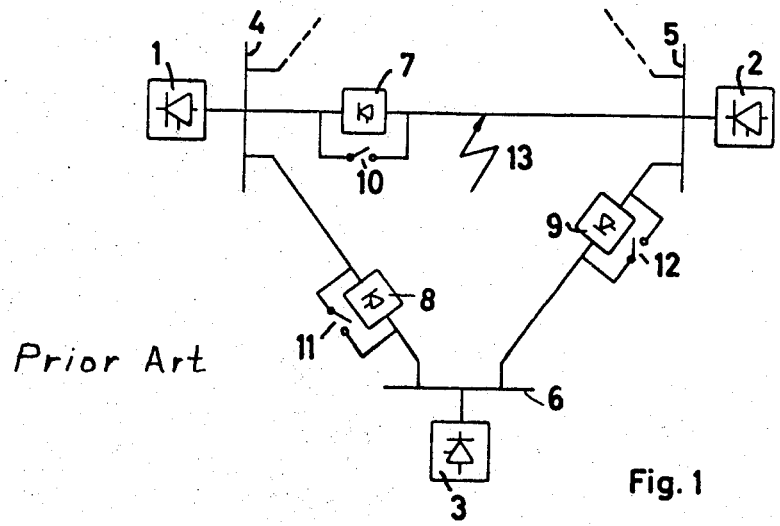

United States Patent
Kanngiesser et al.

[15] 3,694,728
[45] Sept. 26, 1972

[54] CIRCUIT ARRANGEMENT FOR ALTERING CURRENT DISTRIBUTION IN MESH-OPERATED HIGH VOLTAGE DIRECT CURRENT TRANSMISSION NETWORKS

[72] Inventors: Karl-Werner Kanngiesser, Viernheim; Dietrich Kluge, Mannheim, both of Germany

[73] Assignee: Aktiengesellschaft Brown, Boveri & Cie, Baden, Switzerland

[22] Filed: March 18, 1971

[21] Appl. No.: 125,733

[30] Foreign Application Priority Data

March 25, 1970 Germany..........P 20 14 375.3

[52] U.S. Cl..................................321/11, 321/27 R
[51] Int. Cl..........................................H02m 1/18
[58] Field of Search......321/2, 5, 11, 14, 27; 307/51, 307/82, 92, 93

[56] References Cited

UNITED STATES PATENTS

| | | | |
|---|---|---|---|
| 3,275,838 | 9/1966 | Alstrom | 307/82 |
| 3,353,029 | 11/1967 | Rolfes | 307/51 |
| 3,495,129 | 2/1970 | Donner et al. | 321/11 X |
| 3,525,032 | 8/1970 | Torok | 323/2 UX |
| 3,548,289 | 12/1970 | Liska et al. | 323/24 X |

FOREIGN PATENTS OR APPLICATIONS 1,044,474  9/1966  Great Britain...............307/82

*Primary Examiner*—William M. Shoop, Jr.
*Attorney*—Pierce, Scheffler & Parker

[57] ABSTRACT

A high voltage direct current mesh-operated network comprises several interconnected stations for effecting an exchange of power by means of converters located at the stations and which are connected to alternating current networks, the station converters being operated selectively either in a rectifier mode or an inverter mode depending upon the direction of the flow of direct current over the branch line between any two stations. To control the level of the direct current flowing over the branch lines, an auxiliary regulatable rectifier arrangement is disposed in each branch and is constituted by two regulatable rectifier systems connected in an anti-parallel manner. One of the rectifier systems conducts while the other system blocks depending upon the direction of the current flow in the branch.

7 Claims, 2 Drawing Figures

CIRCUIT ARRANGEMENT FOR ALTERING CURRENT DISTRIBUTION IN MESH-OPERATED HIGH VOLTAGE DIRECT CURRENT TRANSMISSION NETWORKS

This invention relates to a circuit arrangement for altering the current distribution within a high voltage D.C. network, fed via rectifier installations from a plurality of A.C. networks and from which energy is supplied through a plurality of A.C. networks fed from inverter installations.

The said circuit arrangement serves to set the ratio of current distribution or to alter it so that given current levels can be established in the respective branch circuits or the exceeding of a given current strength can be prevented. To this end auxiliary rectifiers are disposed in the branch circuits, which generate auxiliary voltages variable as to level and polarity with energy flow in both directions, said rectifiers being adapted to be so regulated or controlled that the voltage differences between the terminal points of the branch circuits can be altered for the purpose of adjusting to a desired level the current in said branch circuits.

The use of auxiliary rectifiers in this manner is known from German specification 1513827. The circuit described therein can take the following form: a transmission line contains an interrupter switch, in parallel with which is connected a rectifying bridge circuit via a polarity reversing switch. On the A.C. side the rectifier bridge circuit is connected to a star-wound current transformer. Such a circuit arrangement is, however, attended with certain drawbacks:

1. In the case of mesh-operated high voltage D.C. transmission networks, fed from a plurality of A.C. networks, frequent changes in the direction of flow of energy are to be expected, which require to be controlled by the polarity-reversing switch of the rectifier in the D.C. line. Such switches, however, only permit a limited number of reversals, each of which takes a finite time. The important question, however, is not merely the number of reversals, but above all the time interval taken for such a reversal. As is known such reversals by means of polarity-changing switches can only be allowed to take place when the conduction current is at a zero value. The operation of polarity reversal requires a relatively long period for completion during which the conduction current must be kept at zero. The result thereof can be the setting up of instability in the D.C. network and in the A.C. networks connected thereto. A polarity changing switch of this type is not able to cope with the rapid directional changes of energy such as are frequently to be met with in mesh-operated high voltage D.C. transmission networks.

2. If a fault occurs the "auxiliary recetifier" cannot be protected. It is required to carry the full short circuit current in the conductor and in critical cases must withstand high tension voltage, so that its destruction becomes inevitable. Additional precautions must therefore be taken to provide adequate protection when breakdown occurs.

3. The transformers which are needed for supplying the rectifier circuit in the D.C. circuit, must be capable of withstanding the high D.C. voltage in the transmission line. Despite their low power rating, such transformers are very costly, a circumstance which detracts from the economic feasibility of such an arrangement.

4. The rectifier circuit for injecting a direct axis voltage component can be caused to enhance or diminish as required, the current flowing at any time. In practice, however, this arbitrary alternation of the branch current affords no advantage since apart from the increased outlay on technical control devices, the introduction of the auxiliary rectifying circuit can no longer result in current distribution with minimum circuit losses.

5. If the auxiliary rectifier is used to achieve the maximum limitation of current, it requires high reactive power when operating under normal circuit conditions, because it is controlled with a firing angle of 90°. It is consequently preferable to devise suitable measures for reducing the reactive power requirements of the auxiliary rectifier.

The object of the invention is to achieve rapid and reliable directional changes of energy, whilst ensuring protection of the auxiliary rectifier if breakdown occurs. The solution of this problem is based on a circuit arrangement of the type set forth at the outset, but wherein the auxiliary rectifier consists according to the invention in the provision of two rectifier systems in anti-parallel coupling to deal with said directional changes of energy. In order to avoid reversal using pole-reversing switches when rapid directional changes of energy occur, one limb of the said anti-parallel circuit arrangement preferably conducts in one direction of current flow and the other limb, the valves of which are connected in opposition to the flow of current, remains non-conducting owing to the effect of the switching arrangement on the grid control. According to the invention moreover, a control device is provided to deal with breakdowns, which shorts out the affected circuit by means of one limb of the anti-parallel circuit arrangement. Both limbs of the anti-parallel circuit may be connected to the same transformer secondary winding.

A particularly important feature of the circuit arrangement of the invention is the protection afforded to the auxiliary rectifier against over-voltage and excess current. In order to protect it from damage due to the passage of excess current, quick-acting switches are provided which come into operation in the case of breakdown and short circuit the auxiliary rectifier. Since the short circuit current is now by-passed away from the valves, no risk arises thereto. Suitable switches for this purpose are those of the known by-pass type having a response time of about 5 milliseconds. In the case of line short circuits, the actuating signal for the switch can be derived from the line protection fuse or in case of internal bridge short circuits it can be derived from the differential protection fuse.

Figure 2:
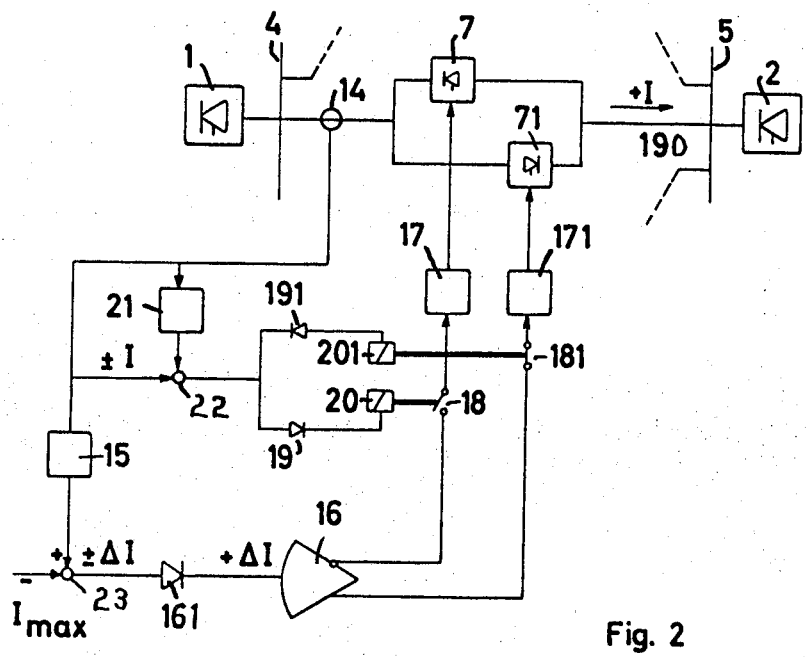

The foregoing as well as other objects and features of the invention will become more apparent from the following detailed description of one suitable embodiment thereof and from the accompanying drawings wherein:

FIG. 1 is an electrical schematic of a high voltage direct current transmission network illustrating a conventional arrangement for placing the auxiliary rectifiers in the branches of the network; and FIG. 2 is also an electrical schematic of a high voltage direct current transmission network similar to FIG. 1 but showing the modification thereof in accordance with the invention wherein auxiliary rectifiers arranged in antitparallel are located in the branches of the network, the necessary controls for the auxiliary rectifiers also being included schematically.

With reference now to FIG. 1, a typical high voltage direct current mesh-operated network includes a plurality of interconnected stations. Station 1, for example, may be an inverter station and stations 2 and 3 rectifier stations. The inverter station 1 operates from a busbar 4, rectifier station 2 operates on a busbar 5 and rectifier station 3 operates on a busbar 6. Auxiliary rectifiers 7, 8 and 9 having respective controllable by-passes or shunts 10, 11 and 12 are located in the branches.

In case a fault occurs as indicated by the reference numeral 13, the auxiliary rectifier 7 is exposed to the full line voltage. The voltage at the busbar 4 of the inverter 1 at first remains constant because it is maintained by other rectifier stations of the multipoint network, for example, the rectifier station 3. The short-circuit current is fed exclusively from the rectifier 2 as long as the auxiliary rectifier 7 remains non-conducting. Since closure of the by-pass 10 only comes into operation after about 5 milliseconds, damage or stress due to exposure to the full line voltage cannot be prevented.

In order to protect the auxiliary rectifier itself against such excessively high voltages, it is necessary in the case of a fault, to short it out without delay. In the case of the arrangement according to the invention, a regulating device by-passes the short circuit from the affected rectifier system, by deflecting or releasing the current flow to a second (rectifier) system FIG. 2 illustrates an embodiment of the circuit arrangement according to the invention. The two systems connected in anti-parallel circuit arrangement are designated as 7 and 71 respectively. The auxiliary rectifiers 7 and 71 are arranged in the branch line which connects the D.C. busbars 4 and 5. The branch current is measured with its magnitude and its polarity by means of a well known current transformer 14. The output current transformer 14 is applied to block 15 which derives the magnitude of said output. The output of block 15 is compared with a predetermined reference value $I_{Ref}$ by means of a comparing unit 23, p.e. a usual transitorized operational amplifier. It is essential that said reference value $I_{Ref}$ is identical with the maximal allowable branch current $I_{max}$. The output of comparing unit 23, which is corresponding to the deviation $\Delta I$ of actual value from reference current value is applied to a current controller 16. As the controller 16 is provided for coming only into action when the actual current exceeds the maximal allowable branch current $I_{max}$, a diode 161 is provided between the comparing unit 23 and the controller 16 which is poled so that only positive deviations $+\Delta I$ are allowed to pass. The controller 16 is designed so that in case of a positive deviation $+\Delta I$, an output corresponding to a firing angle of 90° is applied to a grid control unit 17 and 171, respectively, i.e. the D.C. voltage of the auxiliary rectifier becomes zero. The controller 16 has two outputs, one of which advances the firing angle of the grid control unit 17 by $\alpha$; the other advances the firing angle of the grid control unit 171 by the firing angle 180 $-\alpha$. In order to avoid circulatory currents being set up, firing pulses are only transmitted to the system the valves of which are poled in the forward conducting position. For this purpose the break contacts are provided with two switch devices 18 and 181 respectively. The switch devices 18 and 181 are each controlled by a trip coil solenoid 20 and 201, respectively, whose inputs are connected with a comparing device 22 by means of diodes 19 and 191 which are arranged in an antiparallel manner. A first input terminal of comparing unit 22 is fed by the output of current transformer 14 and a second input terminal is fed by the output of a unit 21 whose function is later described. In the example shown in FIG. 2 switch device 181 is closed so that the auxiliary rectifier 71 is operated since the D.C. current flows in the direction of the arrow 190 (positive direction) as indicated. The switch device 18 is opened, because a positive output of comparing device 22 applies diode 19 in conducting direction so that the trip coil solenoid 20 is excited. When the direction of current flow changes, the auxiliary rectifier 7 comes into operation by opening of switch 181 and closing of switch 18 because the output of device 22 becomes negative and applies diode 191 in conducting direction.

As is known, during the normal operation of an antiparallel circuit arrangement when both its systems are controlled, a circulatory current is set up, which is superimposed on the direct current flow of the valve which is in a conducting state at any instant. This can be limited by the use of chokes to a fraction of the rated current, so that the losses remain at a low level. In order to suppress this circulatory current completely in accordance with the invention, that rectifier which is not conducting is kept completely blocked and is caused to conduct only when the current flow of the other rectifier falls to a zero value. The effect of this measure can with advantage be enhanced by a unit 21 whose input terminal is applied by the output of current transformer 14 and whose output corresponds to the current gradient $di/dt$. If the slope of the current gradient exceeds a predetermined value, then the other system immediately receives control pulses. This ensures that the conducting system which is at risk will be by-passed in the shortest possible time even if there is a rapid change of current strength in the affected branch and excessively high voltages will be excluded therefrom.

In order to save outlay on special transformers for the auxiliary rectifier according to the invention, this rectifier is fed, for example, via secondary windings of the main station transformer which is at the maximum D.C. potential. If the auxiliary rectifier is not fed from additional secondary windings on the main rectifier transformer, but from auxiliary transformers provided especially for the purpose, then outlay for designing them to operate from the full line voltage can be avoided by installing said transformers as insulated units and connecting them to the secondary winding of the main rectifier transformer operating at the maximum D.C. potential.

In order to avoid losses due to the control of the current in the branches, the control of the auxiliary rectifier is arranged so that it fires only when the maximum permissable load current in the leads is exceeded. In case of this overload function of the auxiliary rectifiers is to limit the current in the branch limbs to their maximum value. In this way operation with minimal losses is made possible under the normal load conditions.

In order to reduce reactive power requirements of the auxiliary rectifier during operation with a firing angle of 90° which corresponds to the inverter mode, the auxiliary rectifier can take the form of two or more series-connected partial rectifiers, of which half at once time operates in the rectifying mode and the other half operates in the inverter mode. When voltage change is required only one partial rectifier operates with phase shift control; the other being operated however in the rectifier - or inverter modes. Heavy outlay on transformer is reduced by feeding each rectifier not from its own transformer, but from a single transformer wound with a plurality of secondary winding.

The circuit arrangement according to the invention affords the following advantages; it enables rapid directional energy changes to take place with certainty; the auxiliary rectifiers are protected when breakdowns occur; the setting up of circulating currents is avoided; a saving is made on outlay for transformers; currents in the branch networks are controlled with minimum circuit loss and the reactive power load of the auxiliary rectifier can be maintained at a low level.

We claim:

1. A high voltage direct current mesh-operated network comprising several stations interconnected by high voltage direct current branch lines for effecting an exchange of power between the stations, converters located respectively at said stations and which are connected to an alternating current network, said converters being selectively operated in a rectifier mode or an inverter mode depending upon the direction of the direct current power flow over a branch line between any two stations, an auxiliary regulatable rectifier arrangement disposed in each branch line, each said rectifier arrangement being constituted by two regulatable rectifier systems connected in an anti-parallel manner, means rendering one of said rectifier systems conductive while the other remains non-conductive and vice versa dependent upon the direction of the flow of direct current between stations and means maintaining one of said rectifier systems in its non-conductive state until the current flow in the other rectifier system falls to zero when reversing the direction of current flow between stations thereby preventing flow of a circulatory current in the branch line between the two anti-parallel rectifier systems at the time of current reversal in the branch line.

2. A high voltage direct current mesh-operated network comprising several stations interconnected by high voltage direct current branch lines for effecting an exchange of power between the stations, converters located respectively at said stations and which are connected to an alternating current network, said converters being selectively operated in a rectifier mode or an inverter mode depending upon the direction of the direct current power flow over a branch line between any two stations, an auxiliary regulatable rectifier arrangement disposed in each branch line, each said rectifier arrangement being constituted by two regulatable rectifier systems connected in an anti-parallel manner, means placing one of said rectifier systems in operation while the other remains non-operative and vice versa dependent upon the direction of the flow of direct current between stations and means responsive to an increase in magnitude of the direct current power flow above a selected maximum value for activating the non-operative rectifier system thereby to by-pass the rectifier system which is in operation.

3. A high voltage direct current mesh-operated network as defined in claim 2 and which further includes means responsive to an increase in gradient of the direct current power flow above a selected maximum value for activating the non-operative rectifier system thereby to by-pass the rectifier system which is in operation.

4. A high voltage direct current mesh-operated network as defined in claim 3 wherein said selected maximum value of the increase in current gradient is formed by the actual value of the direct current.

4. A high voltage direct current mesh-operated network as defined in claim 2 wherein said anti-parallel connected auxiliary rectifier systems are constituted by controllable valves to which control voltages from grid control units are applied and wherein said means responsive to an increase in the magnitude of the direct current power flow above a selected maximum value include means for changing the respective firing angles of said grid control units such that the non-operative rectifier system is activated thereby to by-pass the rectifier system which is in operation.

6. A high voltage direct current mesh-operated network as defined in claim 5 wherein said means for changing the respective firing angles of said grid control units in response to an increase in the magnitude of the direct current power flow above a selected value comprises means comparing the magnitude of the actual current flow with a selected maximum magnitude to determine both the deviation and its sense, and means responsive only to a deviation having a sense connotative of an increase in the actual current flow above said selected maximum value for advancing the firing angle of the grid control voltage for the valves of one of said rectifier systems by $\alpha$ and for advancing the firing angle of the grid control voltage for the valves of the other rectifier system by $180° - \alpha$.

7. A high voltage direct current mesh-operated network as defined in claim 2 wherein said anti-parallel connected rectifier systems function to limit the current in the branches of the direct current network to their maximum values.

* * * * *